(12) United States Patent
Kothule et al.

(10) Patent No.: US 10,319,075 B2
(45) Date of Patent: Jun. 11, 2019

(54) METHOD FOR UPSCALING NOISY IMAGES, AND APPARATUS FOR UPSCALING NOISY IMAGES

(71) Applicant: THOMSON LICENSING, Issy les Moulineaux (FR)

(72) Inventors: Mangesh Kothule, Pune (IN); Jordi Salvador Marcos, Hamburg (DE)

(73) Assignee: InterDigital CE Patent Holdings, 3 rue due Colonel Moll (FR)

( * ) Notice: Subject to any disclaimer, the term of this patent is extended or adjusted under 35 U.S.C. 154(b) by 145 days.

(21) Appl. No.: 15/343,254

(22) Filed: Nov. 4, 2016

(65) Prior Publication Data

US 2017/0132760 A1 May 11, 2017

(30) Foreign Application Priority Data

Nov. 9, 2015 (EP) .................................. 15306776

(51) Int. Cl.
*G06T 3/40* (2006.01)
*G06T 5/00* (2006.01)
*G06T 5/50* (2006.01)

(52) U.S. Cl.
CPC .......... *G06T 3/4076* (2013.01); *G06T 3/4046* (2013.01); *G06T 3/4053* (2013.01); *G06T 5/002* (2013.01); *G06T 5/50* (2013.01); *G06T 2207/20016* (2013.01); *G06T 2207/20021* (2013.01); *G06T 2207/20024* (2013.01); *G06T 2207/20081* (2013.01); *G06T 2207/20084* (2013.01); *G06T 2207/20221* (2013.01)

(58) Field of Classification Search
CPC ... G06T 3/4076; G06T 3/4046; G06T 3/4053; G06T 5/002; G06T 5/50; G06T 2207/20016; G06T 2207/20021; G06T 2207/20024; G06T 2207/20081; G06T 2207/20084; G06T 2207/20221
See application file for complete search history.

(56) References Cited

U.S. PATENT DOCUMENTS

2007/0083114 A1* 4/2007 Yang ........................ A61B 8/00
600/437
2013/0034299 A1 2/2013 Lin et al.

FOREIGN PATENT DOCUMENTS

| EP | 2615579 | 7/2013 |
| WO | WO2011092696 | 8/2011 |
| WO | WO2015121422 | 8/2015 |

OTHER PUBLICATIONS

Singh, Abhishek, Fatih Porikli, and Narendra Ahuja. "Super-resolving noisy images." Proceedings of the IEEE Conference on Computer Vision and Pattern Recognition. 2014.*

(Continued)

*Primary Examiner* — Jonathan S Lee
(74) *Attorney, Agent, or Firm* — Brian J. Dorini; Xiaoan Lu

(57) ABSTRACT

With known image upscaling methods of noisy images, important detail information is lost during denoising. A method for upscaling noisy input images comprises upscaling a noisy input image to obtain a noisy High-Resolution (HR) image, denoising the noisy input image to obtained a denoised Low-Resolution (LR) image, upscaling the denoised LR image to obtain an upscaled denoised LR image, and combining the noisy HR image and the upscaled denoised LR image to generate a denoised HR image.

16 Claims, 1 Drawing Sheet

(56) References Cited

OTHER PUBLICATIONS

Gan, Tao, and Wenmiao Lu. "Image denoising using multi-stage sparse representations." Image Processing (ICIP), 2010 17th IEEE International Conference on. IEEE, 2010.*

Wang, Zhaowen, et al. "Deep networks for image super-resolution with sparse prior." Proceedings of the IEEE International Conference on Computer Vision. 2015.*

Wang, Zhifei, et al. "Low-resolution face recognition: a review." The Visual Computer 30.4 (2014): 359-386. (Year: 2014).*

Dabov et al., "Image Denoising by Sparse 3D Transform-Domain Collaborative Filtering", IEEE Transactions on Image Processing, vol. 16, No. 8, Aug. 2007, pp. 2080-2095.

Dong et al., "Learning a Deep Convolutional Network for Image Super-Resolution", European Conference on Computer Vision, Zurich, Switzerland, Sep. 6, 2014, pp. 184-199.

Glasner et al., "Super-Resolution from a Single Image", IEEE 12th International Conference on Computer Vision, Kyoto, Japan, Sep. 27, 2009, pp. 349-356.

Yang et al., "Exploiting Self-similarities for Single Frame Super-Resolution", 10th Asian Conference on Computer Vision, Queenstown, New Zealand, Nov. 8, 2010, pp. 497-510.

* cited by examiner

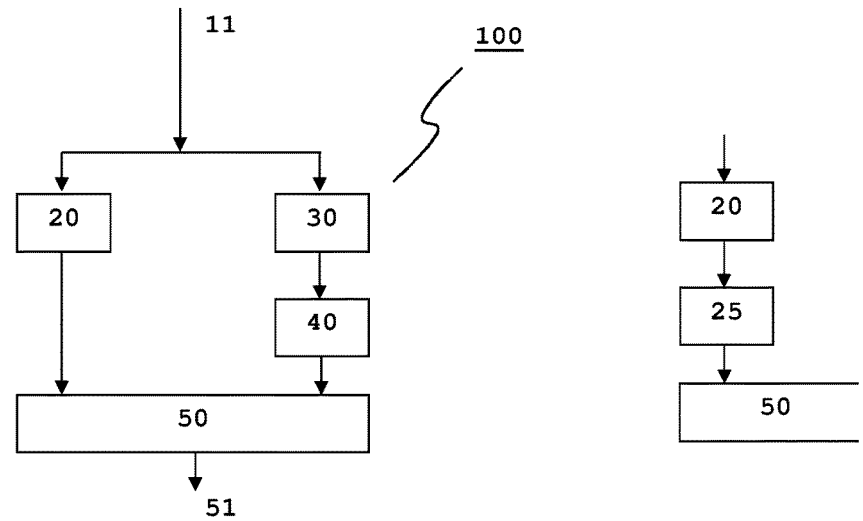
Fig. 1(a)
Fig. 1(b)
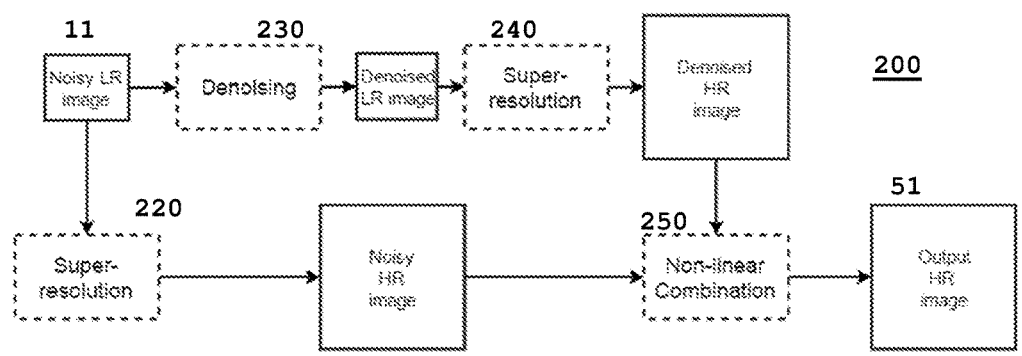
Fig. 2
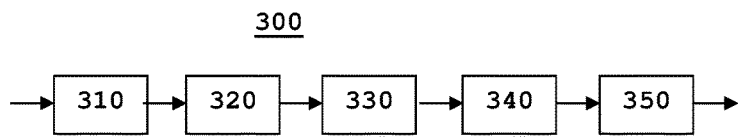
Fig. 3

METHOD FOR UPSCALING NOISY IMAGES, AND APPARATUS FOR UPSCALING NOISY IMAGES

REFERENCE TO RELATED EUROPEAN APPLICATION

This application claims priority from European Application No. 15306776.4, entitled "Method For Upscaling Noisy Images, and Apparatus for Upscaling Noisy Images," filed on Nov. 9, 2015, the contents of which are hereby incorporated by reference in its entirety.

FIELD OF THE INVENTION

This invention relates to a method for upscaling images and an apparatus for upscaling images.

BACKGROUND

Image super-resolution is the task of generating a magnified high-resolution (HR) image from a low-resolution (LR) image. This magnified image should preserve the high-frequency (HF) content of the LR image. Conventionally, a HR image is obtained from a noisy LR image by first denoising and then upscaling.

WO2015121422A discloses a noise-aware single-image super-resolution (SI-SR) algorithm, which automatically cancels additive noise while adding detail learnt from lower scales. In contrast with common SI-SR techniques, the method does not assume the input image to be a clean source of examples. Instead, the method exploits a recent and efficient in-place cross-scale self-similarity prior for both learning fine detail examples to complement the interpolation-based upscaled image patches and reducing image noise.

In EP3086280, a coarse estimate of the super-resolved image is first obtained by interpolation. Then, each patch of the upscaled image is mean-subtracted and normalized to top-down traverse several independent hierarchical nonlinear mapping functions obtained during offline training. During each top-down traversal, the similarities between the hierarchical modes in the map and the normalized patch are combined and the map with best similarity is chosen, thus improving the quality achieved by an alternative solution with a single map. The mean-subtracted patch is then processed by the locally linear map corresponding to the resulting linearization in the chosen map and added to the coarse patch.

[Dabov2007] discloses image denoising by a two-step method, where each step includes a grouping of similar patches by block-matching, 3D transform, a collaborative filtering stage and an inverse 3D transform and composition of the reconstructed image. During the first stage, the collaborative filter uses a hard-thresholding, whereas during the second stage a finer Wiener denoising filter is used. The selection of the threshold and filter coefficients requires knowledge of the noise level.

[Dong2014] uses an approach based on a convolutional neural network (CNN) with multiple layers to upscale an image.

SUMMARY OF THE INVENTION

A problem of the known image upscaling methods is that when an input image is noisy, important detail information is lost during denoising, which is difficult to recover during upscaling.

The present invention provides a solution for improved upscaling of noisy images.

In one embodiment, a method for upscaling noisy input images comprises upscaling a noisy input image to obtain a noisy High-Resolution (HR) image, denoising the noisy input image to obtain a denoised Low-Resolution (LR) image, upscaling the denoised LR image to obtain an upscaled denoised LR image, and combining the noisy HR image and the upscaled denoised LR image to generate a denoised HR image.

An apparatus that utilizes the method is disclosed in claim 14. An apparatus, in one embodiment, is disclosed in claim 15.

According to one embodiment, a computer readable medium has executable instructions to cause a computer to perform a method as disclosed in the claims.

According to one embodiment, an apparatus for upscaling comprises at least one hardware component and a non-transitory, tangible, computer-readable, storage medium tangibly embodying at least one software component that, when executing on the at least one hardware component, causes the at least one hardware component to perform a method as disclosed in the claims.

In one embodiment, the at least one hardware component comprises at least one hardware processor.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIGS. 1(a)-1(b) are flow-charts of an image upscaling method;

FIG. 2 is a block diagram of an apparatus for image upscaling;

FIG. 3 is the structure of an image denoising sub-system.

DETAILED DESCRIPTION OF THE INVENTION

Conventionally, a HR image is obtained from a noisy LR image by first denoising and then upscaling. In the present method, in one embodiment, a noisy LR image is upscaled to get a "noisy HR" image. This image has noise upscaled, but the HF structures are also preserved. The LR image is denoised first, and then upscaled to get a "denoised HR" image. This image is without noise, but it also has less HF information. To achieve a visually good HR image from a noisy LR image, the invention combines the "noisy HR" and "denoised HR" non-linearly to produce a better HR image. In one embodiment, the non-linearity is obtained by thresholding. Images obtained from such combination have better PSNR and also are visually more pleasant than those obtained using conventional methods.

FIG. 1(a) shows, in one embodiment, a flow-chart of an image upscaling method. The method 100 for upscaling noisy input images comprises upscaling 20 a noisy input image 11 to obtain a noisy HR image, denoising 30 the noisy input image 11 to obtain a denoised LR image, and upscaling 40 the denoised LR image to obtain an upscaled denoised LR image. The noisy HR image and the upscaled denoised LR image are combined 50 to generate a denoised HR image 51.

In the upscaling 20, the noisy LR input image is upscaled using a method for single image super-resolution. This operation gives the "noisy HR" image. The noisy LR input image is also denoised 30 using a denoising algorithm to produce denoised LR image, and then the denoised LR image is upscaled 40. In one embodiment, the two upscaling stages 20,40 use the same SR algorithm. In one embodiment, the two upscaling stages 20,40 use different SR algorithms. In one embodiment, an additional denoising 25 is performed after the upscaling 20, as shown in FIG. 1 (b). The additional denoising 25 may be very simple. The denoised HR image and the noisy HR images are combined using a network of non-linear filters to generate and output a HR image, which is an enlarged and high resolved version of the LR input image.

FIG. 2 shows, in one embodiment, an apparatus for upscaling noisy input images. The apparatus 200 comprises a first image upscaler 220 being adapted for upscaling 20 a noisy input image 11 to obtain a noisy HR image, an image denoiser 230 being adapted for denoising 30 the noisy input image 11 to obtained a denoised LR image, a second image upscaler 240 being adapted for upscaling 40 the denoised LR image to obtain an upscaled denoised LR image, and an image combiner 250 being adapted for combining the noisy HR image and the upscaled denoised LR image to generate a denoised HR image 51. In embodiments, the combiner 250 combines e.g. pixels or patches of the noisy HR image with pixels or patches of the upscaled denoised LR image. In one embodiment, the input image 11 is divided into overlapping patches, and all stages of the method and/or the apparatus are applied to these patches. In a final stage 50,250, the processed patches are overlapped to obtain the HR image 51.

In various embodiments, one or more of the first image upscaler 220, the image denoiser 230 and the second image upscaler 240, and the upscaling 20,40 and denoising 30 respectively, comprise various filters, as described below. In principle, any FIR filter types can be used. However, in one embodiment the training may optimize (ie. modify) filter types, filter sizes and filtering coefficients. In other embodiments, the training optimizes just filter sizes and/or filter coefficients, while filter types are given.

In principle, there are three sub-systems used: an image denoising sub-system, an image super-resolution sub-system and an image combination sub-system.

The image denoising sub-system performs image denoising. The goal of image denoising is to remove the noise while keeping the high frequency details i.e. edges, texture etc. in the image. The image denoising sub-system is based on filter banks. In one embodiment shown in FIG. 3, a five stage architecture of the denoising sub-system 300 uses first denoising filtering 310, first thresholding 320, second denoising filtering 330, second thresholding 340 and third denoising filtering 350. In principle, the first denoising filtering 310 and the first thresholding 320 together can be understood as a non-linear filter. The same applies to the second denoising filtering 330 and the second thresholding 340. On the other hand, also the first thresholding 320 and second denoising filtering 330 together can be considered as a non-linear filter, and the same applies to the second thresholding 340 and the third denoising filtering 350. Thus, the denoising sub-system 300 is a network of non-linear filters.

In one embodiment, the first filtering stage 310 has 64 filters with a spatial size of 9×9 pixels. In order to model non-linearity between noisy input and denoised output, a thresholding unit 320,340 is used after every filtering stage. Such thresholding allows positive input values to pass through, while negative values are equated to zero. A cascade of these two stages with a different number of filters and different spatial filter support (ie. used pixels) was used. The last stage 350 of the architecture 300 is again a filtering operation. An exemplary overall configuration in shown in Tab.1.

TABLE 1

Configuration of an exemplary image denoising sub-system

| Stage | Number of filters/type of operation | Spatial Support |
|---|---|---|
| 1 | 64/Filtering | 9 × 9 |
| 2 | 1/Thresholding | 1 × 1 |
| 3 | 64/Filtering | 7 × 7 |
| 4 | 1/Thresholding | 1 × 1 |
| 5 | 1/Filtering | 5 × 5 |

In one embodiment, the coefficients of some or all of the filters are initialized randomly and then learned using a machine learning algorithm that is known as backpropagation. The results of the machine learning algorithm depend on the used training images, but often are similar to those shown in Tab.1.

One effect of the image denoising sub-system is that a noisy LR input image with eg. Gaussian noise has less noise after applying image denoising, but it is also smoother than the input.

The image super-resolution sub-system performs upscaling of the LR image to provide a magnified image with preserved high frequency content. In one embodiment, again a filtering based approach is used for this sub-system, with a different arrangement of filters. In one embodiment, an exemplary configuration of the filters is shown in Tab.2. It also uses a five-stage architecture with a cascaded arrangement of filtering and thresholding operations. The structure shown in FIG. 3 similarly applies to the denoising sub-system.

TABLE 2

Configuration of an exemplary image super-resolution sub-system

| Stage | Number of filters/type of operation | Spatial Support |
|---|---|---|
| 1 | 64/Filtering | 9 × 9 |
| 2 | 1/Thresholding | 1 × 1 |
| 3 | 32/Filtering | 1 × 1 |
| 4 | 1/Thresholding | 1 × 1 |
| 5 | 1/Filtering | 5 × 5 |

Various upscaling factors can be used. For example, an upscaling factor of 2 (per dimension) gives an output image with double size of the input image in both spatial dimensions.

Noisy HR images retain HF contents, which is good, but also contain noise. On the other hand, denoised HR images have less noise, but the images are smoother. The invention combines these two images to produce a final image with reduced noise along with HF contents.

The image combination sub-system combines the noisy HR and the denoised HR image to produce a final output HR image. This network determines the non-linear mapping between an input image and the corresponding output HR image. In one embodiment, a filter based network is used for finding the non-linear mapping. It uses a similar architecture as the filtering networks used for image denoising and image super-resolution. In one embodiment, FIG. 3 shows a network architecture equivalent to the one for combining the input images. In one embodiment, the combining 50 uses a five stage filtering sequence of first combining filtering, first thresholding, second combining filtering, second thresholding and third combining filtering. Tab.3 shows exemplary configuration parameters of the combination sub-system.

TABLE 3

Configuration of combination sub-system

| Stage | Number of filters/type of operation | Spatial Support |
|---|---|---|
| 1 | 64/Filtering | 7 × 7 |
| 2 | 1/Thresholding | 1 × 1 |
| 3 | 32/Filtering | 3 × 3 |
| 4 | 1/Thresholding | 1 × 1 |
| 5 | 1/Filtering | 5 × 5 |

Output images produced by such non-linear network have better PSNR (ie. less noise) than conventionally denoised HR images, eg. about 2 dB increase in PSNR for images with Gaussian noise of a variance of 5, and are visually more pleasant.

Training can be performed, in one embodiment, by using so-called backpropagation of the three sub-systems. This algorithm computes the derivative of an error with respect to the weights (ie. filtering coefficients) in the system. The error is the difference between the desired output image and the output produced by the system. In one embodiment, a squared difference between ground truth and the output image of the system is used as error measure. Then the derivate of the error can be computed with respect to the weights. Weight updates for the weights can be computed by equating the derivate of the error to zero. The gradient of the error is propagated backwards from the weights in the output stage to the weights in the input stage using the chain rule of derivatives. In one embodiment, such weight adjustment is done e.g. in the output stage or in a training stage. Small numbers of training images, e.g. 91 training images, are sufficient to train the networks. For the training, smaller patches are extracted from the images. E.g., a reasonable training patch size, for all three sub-systems, would be 32×32 pixels.

One advantage of the invention is that it is adapted for efficiently upscaling and denoising LR images that include various noise types, such as Gaussian, film grain, coding artefacts etc. That is, the same network architecture can be used for all type of noises, which is not the case for conventional techniques.

One advantage of the disclosed method is that it achieves better quality HR images both in terms of objective (PSNR) and subjective (visual appearance) evaluations.

Depending on training strategies used, the training result may be better if a noise level of the input image is known.

The use of the verb "comprise" and its conjugations does not exclude the presence of elements or steps other than those stated in a claim. Furthermore, the use of the article "a" or "an" preceding an element does not exclude the presence of a plurality of such elements. Several "means" may be represented by the same item of hardware. Furthermore, the invention resides in each and every novel feature or combination of features.

As used herein, a "upscaling" or "denoising" does not describe a mere mathematical abstraction, but instead denotes information embodied in or carried by a physical medium capable of detection by a machine or apparatus. This term includes recorded or transmitted signals, and should be understood to include conveyance by any form of encoding, including pulse code modulation (PCM), but not limited to PCM.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to . . . , one skilled in the art would recognize that the method and devices described herein may be applied to any . . . . It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

CITED REFERENCES

WO2015121422A
EP3086280
[Dabov2007] Dabov et al., "Image denoising by sparse 3D transform-domain collaborative filtering", in Transaction on Image Processing 2007
[Dong2014] Dong et al., "Learning a Deep Convolutional Network for Image Super-Resolution", in Proceedings of European Conference on Computer Vision (ECCV), 2014

The invention claimed is:

1. A method for upscaling noisy input images, comprising:
   upscaling a noisy input image to obtain a noisy High-Resolution, HR, image;
   denoising the noisy input image to obtain a denoised Low-Resolution, LR, image;
   upscaling the denoised LR image to obtain an upscaled denoised LR image; and
   combining, by a series of non-linear filtering steps, the noisy HR image and the upscaled denoised LR image to generate a denoised HR image.

2. The method according to claim 1, wherein for said upscaling the noisy input image and for said upscaling the denoised LR image the same upscaling method is used.

3. The method according to claim 1, wherein the non-linearity is obtained through thresholding.

4. The method according to claim 1, wherein the denoising uses a five stage filtering sequence of first denoising filtering, first thresholding, second denoising filtering, second thresholding and third denoising filtering.

5. The method according to claim 1, wherein the upscaling uses a five stage filtering sequence of first upscaling filtering, first thresholding, second upscaling filtering, second thresholding and third upscaling filtering.

6. The method according to claim 1, wherein the combining uses a five stage filtering sequence of first combining filtering, first thresholding, second combining filtering, second thresholding and third combining filtering.

7. The method according to claim 3, wherein the thresholding sets negative values to zero and lets positive values pass unchanged.

8. The method according to claim 4, wherein coefficients and dimensions of filters for the filtering are initialized randomly and then trained in a training stage by using a machine learning algorithm.

9. The method according to claim 3, wherein dimensions of filters for the filtering are predefined, and coefficients of filters for the filtering are initialized randomly and then trained in a training stage by using a machine learning algorithm.

10. The method according to claim 1, wherein said upscaling, denoising and combining use image patches.

11. An apparatus for upscaling noisy input images, comprising
 a first image upscaler adapted for upscaling a noisy input image to obtain a noisy High-Resolution, HR image;
 an image denoiser adapted for denoising the noisy input image to obtain a denoised Low-Resolution, LR, image;
 a second image upscaler adapted for upscaling the denoised LR image to obtain an upscaled denoised LR image; and
 an image combiner adapted for combining pixels or patches of the noisy HR image and pixels or patches of the upscaled denoised LR image to generate a denoised HR image, wherein the image combiner is configured to use a network of non-linear filters.

12. The apparatus of claim 11, wherein for said upscaling the noisy input image and for said upscaling the denoised LR image the same upscaling method is used.

13. The apparatus of claim 11, wherein the non-linearity is obtained through thresholding.

14. The apparatus according to claim 11, wherein the image denoiser is configured to use a five stage filtering sequence of first denoising filtering, first thresholding, second denoising filtering, second thresholding and third denoising filtering.

15. The apparatus according to claim 11, wherein the upscaling uses a five stage filtering sequence of first upscaling filtering, first thresholding, second upscaling filtering, second thresholding and third upscaling filtering.

16. A non-transitory computer-readable storage medium comprising computer-executable instructions to enable a computer to perform a method for upscaling noisy input images, comprising:
 upscaling a noisy input image to obtain a noisy High-Resolution, HR, image;
 denoising the noisy input image to obtain a denoised Low-Resolution, LR, image;
 upscaling the denoised LR image to obtain an upscaled denoised LR image; and
 combining, by a series of non-linear filtering steps, the noisy HR image and the upscaled denoised LR image to generated a denoised HR image.

* * * * *

UNITED STATES PATENT AND TRADEMARK OFFICE
CERTIFICATE OF CORRECTION

PATENT NO. : 10,319,075 B2
APPLICATION NO. : 15/343254
DATED : June 11, 2019
INVENTOR(S) : Mangesh Kothule and Jordi Salvador Marcos It is certified that error appears in the above-identified patent and that said Letters Patent is hereby corrected as shown below:

In the Claims

At Column 8, Line 32, Claim 16 replace "generated" with --generate--

Signed and Sealed this
Twenty-sixth Day of December, 2023

Katherine Kelly Vidal
*Director of the United States Patent and Trademark Office*